US 8,451,294 B2

(12) United States Patent
Byrne et al.

(10) Patent No.: US 8,451,294 B2
(45) Date of Patent: May 28, 2013

(54) PARTIAL WINDOW VISIBILITY

(75) Inventors: Paul Byrne, Los Altos, CA (US); Hideya Kawahara, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1150 days.

(21) Appl. No.: 12/111,088

(22) Filed: Apr. 28, 2008

(65) Prior Publication Data
US 2009/0267957 A1  Oct. 29, 2009

(51) Int. Cl.
*G09G 5/14* (2006.01)
(52) U.S. Cl.
USPC .......................... 345/629; 345/672
(58) Field of Classification Search
CPC ...................................... G09G 5/14
USPC .................. 345/629, 634, 672, 682
See application file for complete search history.

(56) References Cited

U.S. PATENT DOCUMENTS 4,642,621 A *  2/1987 Nemoto et al. ............... 345/634
2003/0184550 A1* 10/2003 Nally ............................ 345/531

OTHER PUBLICATIONS

Benoit Mansoux, Laurence Nigay; Distributed Display Environments in Computer-Assisted Surgery systems; Sunday, Apr. 3, 2005; CHI 2005 Workshop on Distributed Display Environments, pp. 1-2.*
Ibrahim N. Imam and Dung Tien Nguyen; An Enhanced Video Driver for the IBM Personal Computer; Apr. 1989; IEEE Proceedings Southeastcon '89, Energy and Information Technologies in the Southeast; vol. 3, pp. 1227-1231.*

* cited by examiner

*Primary Examiner* — Jeffery A Brier
(74) *Attorney, Agent, or Firm* — Marsh Fischmann & Breyfogle, LLP; Jon P. Deppe; Kent A. Lembke

(57) ABSTRACT

A video encoder/adapter comprises a virtual display module for partial rendering of a software application image. The virtual display module presents to the software application a virtual display device upon which the software application window is displayed. From the virtual display device, the user identifies one or more portions of the virtual software application window that are to be rendered on the actual display device.

19 Claims, 6 Drawing Sheets

PARTIAL WINDOW VISIBILITY

BACKGROUND OF THE INVENTION

1. Field of the Invention

Embodiments of the present invention relate, in general, to rendering of computer application and particularly to the partial rendering of a computer application.

2. Relevant Background

A computer, among many other things, is a device that is capable of user interaction. There are a number of means by which a user can interact with a computer and thus provide input to a particular software application. These include a keyboard, a mouse or pointing device, a microphone, and the display. Each of these user interfaces provides a user with the ability to provide and interpret data.

The rendering of a computer application is a vital component in a computer system. Displays may vary from a small screen associated with a laptop or desktop computer to that screen found on a cell phone or personal data assistant. In each case, a software application provides to the display information for interpretation by the user. Based on that data the user can use, modify, delete, or add data and employ the software for a variety of its designed purposes.

A computer executes several applications simultaneously. The computer time shares or multiplexes the central processing unit so that each application can appear to operate simultaneously. Indeed some computers have dual processor capability to provide true simultaneous execution of two or more software applications. Many software applications include instructions to render data to a display device. In such a case, the central processor unit provides to a display adapter instructions compatible with a display device.

FIG. 1 is a typical rendering of a software application as is known in the prior art. As shown in FIG. 1, a typical display device 100 can show an application window 110. The window 110 can be sized to encompass the entire screen or only a portion of the display device 100. As is known in the art, when a window does not encompass the entire viewable area, a system background screen is present. The window 110 produced by the software application generally includes a menu 140 or other functional region in which user interactive control menus reside. Within the viewable area of the window 110, the software application can provide text 120, graphics 130, and the like as governed by the software application.

As discussed, a display device can render multiple software application windows. FIG. 2 shows a rendering of two software application windows as is known in the prior art. Each window 210, 220 shows a complete, albeit smaller, rendering of the software application. While the depiction shown in FIG. 2 presents only two software application windows, one skilled in the art will recognize that a plurality of software application windows can be presented within the viewing confines of the display device. Note, however, that each window 210, 220 includes a menu, scroll bars and other features that would be found in a full screen display.

Absent from the rendering capability of current operating systems, display devices, and software applications is the ability to pick and choose what portion of a particular software application window the user would like to view. Furthermore, as a window of a particular software application is diminished, i.e. made smaller, the area in which the data is presented becomes a smaller percentage of the entire viewing window since the menus and control bars remain fixed in size. For example, consider a software application window that in a full screen display view uses 90% of the screen for the display of data and only 10% for control bars and menu functions. As the user shrinks the view to use other areas of the display screen for other functions or software applications, the actual area within the window on a percentage basis for the display of data decreases. It remains a challenge to display only a portion of a particular software application's window.

SUMMARY OF THE INVENTION

Methods and systems for the partial rendering of a software application are hereafter described. According to one embodiment of the present invention, a video encoder/adapter comprises a virtual display module for partial rendering of a software application image. The virtual display module presents to the software application a virtual display device upon which the software application window is virtually displayed. From the virtual display device, the user identifies one or more portions of the virtual software application window that are to be rendered on the actual display device.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to another embodiment of the present invention, a method for partial window display includes the virtual rendering of one or more software applications on a virtual display. Upon viewing the entire software application window on the display device, the user identifies one or more portions for the virtual software application window for display on the actual display device. The selected portions of the software application window remain displayed while the remaining portions of the rendering are removed from the display device. While the display device reverts to the background system display, or that of other software application renderings, the computer believes that the entire rendering of the software application is being carried out. Thus the partial rendering is not cluttered by data, menus, or control functions that are not of interest to the user.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
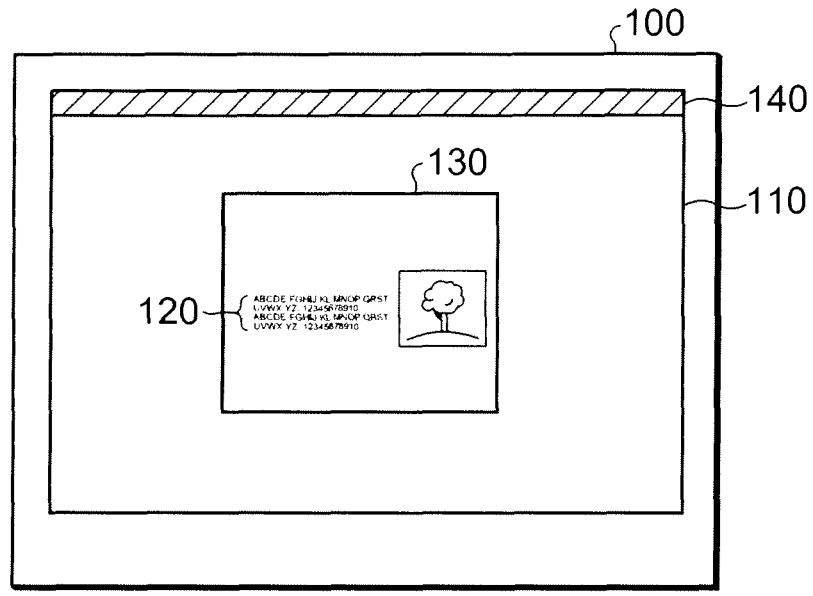
FIG. 1 shows a display device rendering a software application window as is known in the prior art.
Figure 2:
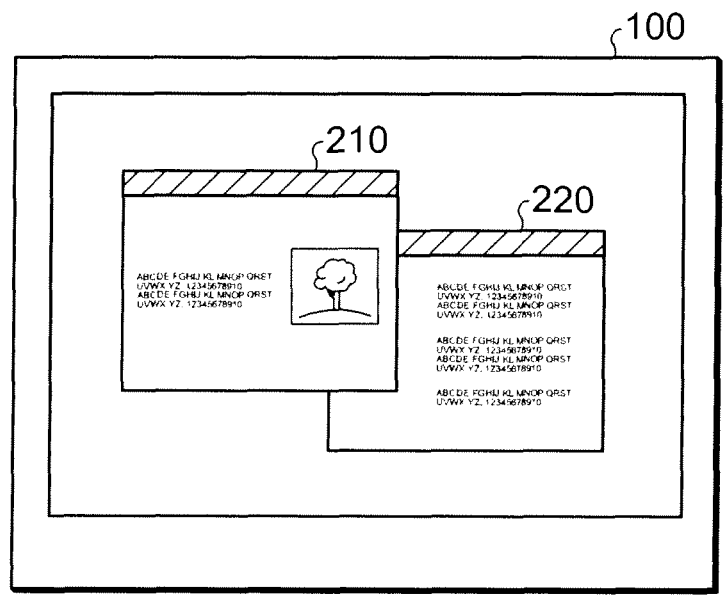
FIG. 2 shows a display device simultaneously rendering two software application windows as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

An enabling description for partial rendering of an application image on a display device is hereafter described by way of example. A software application operates to form an image for rendering on a display device. According to one embodiment of the present invention, a portion of this rendering is identified and displayed on the display device while the remaining portions of the software application image are removed. Interposed between a microprocessor responsible for creating the software application image and the display device is, according to one embodiment of the present invention, a virtual display buffer. Initially the entire software application image is both rendered in the virtual display buffer and on the display device. However, once a portion of the displayed image is selected by the user, the remaining portions of the software application image are removed from the display device. Meanwhile, the image rendered in the virtual display buffer remains complete and unchanged such that to the software application being executed by the microprocessor the rendering of the image to the display device is unaltered.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 3:
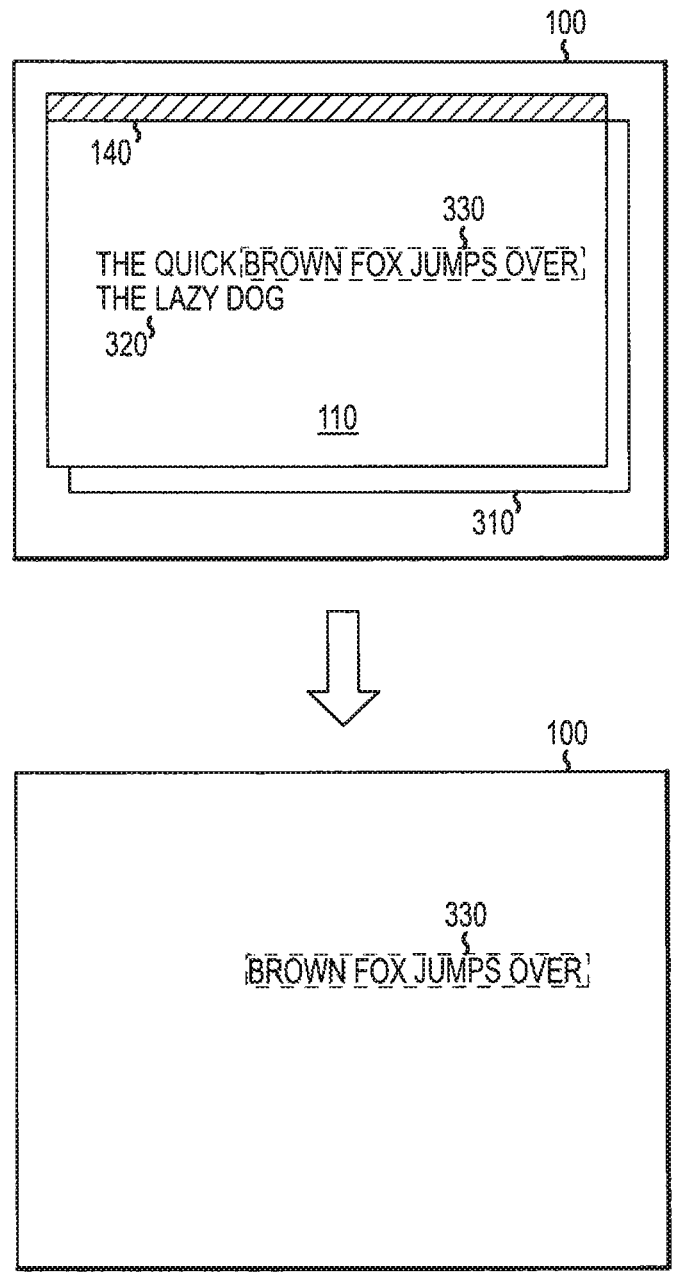
FIG. 3 is a general depiction of a virtual rendering of a software application window and the actual display of a portion of that window on a computer display device according to one embodiment of the present invention.

FIG. 3 shows a high level depiction of the viewing area of a display device in which a portion of a software application window is selected and displayed according to one embodiment of the present invention. The viewing area of a display device 100 shown in FIG. 3 fully occupies a software application window 10. As is typical with software applications, the window 110 that is depicted possesses a menu bar 140 and scroll bars 310. Depending on the extent of the functionality of this menu bar 140 and scroll bars 310, the actual viewing area within the software application window 110 can be significantly diminished. Including in the window 110 depicted in FIG. 3 is a section of text 320. In this example the text 320 includes the phrase, "The quick brown fox jumps over the lazy dog."

According to one embodiment of the present invention, a user selects or identifies a portion of the viewing area of the software application widow 110 for display. In this example, a portion 330 of the depicted phrase, "brown fox jumps over", is selected. Once selected, the user directs the remaining portions of the software application window to be removed from the viewing area of the display device 100. As shown in the lower portion of FIG. 3, only the selected portion 330 of the text 320 is rendered in the viewing area of the display device 100. In this case, the phrase "brown fox jumps over" is displayed in the viewing area of the display device 100 in the same position as if the entire software application window 110 was displayed.

Another aspect of the present invention but not shown is the ability to move the displayed portion 330 of the software application window 110 through the entire viewing area of the display device 100. Thus the rendering of the phrase "brown fox jumps over" could be placed in any position within the viewing area of the display device 100 window without affecting the operation of the software application. From the software application's perspective, the entire software application image is continually being rendered.

Figure 4:
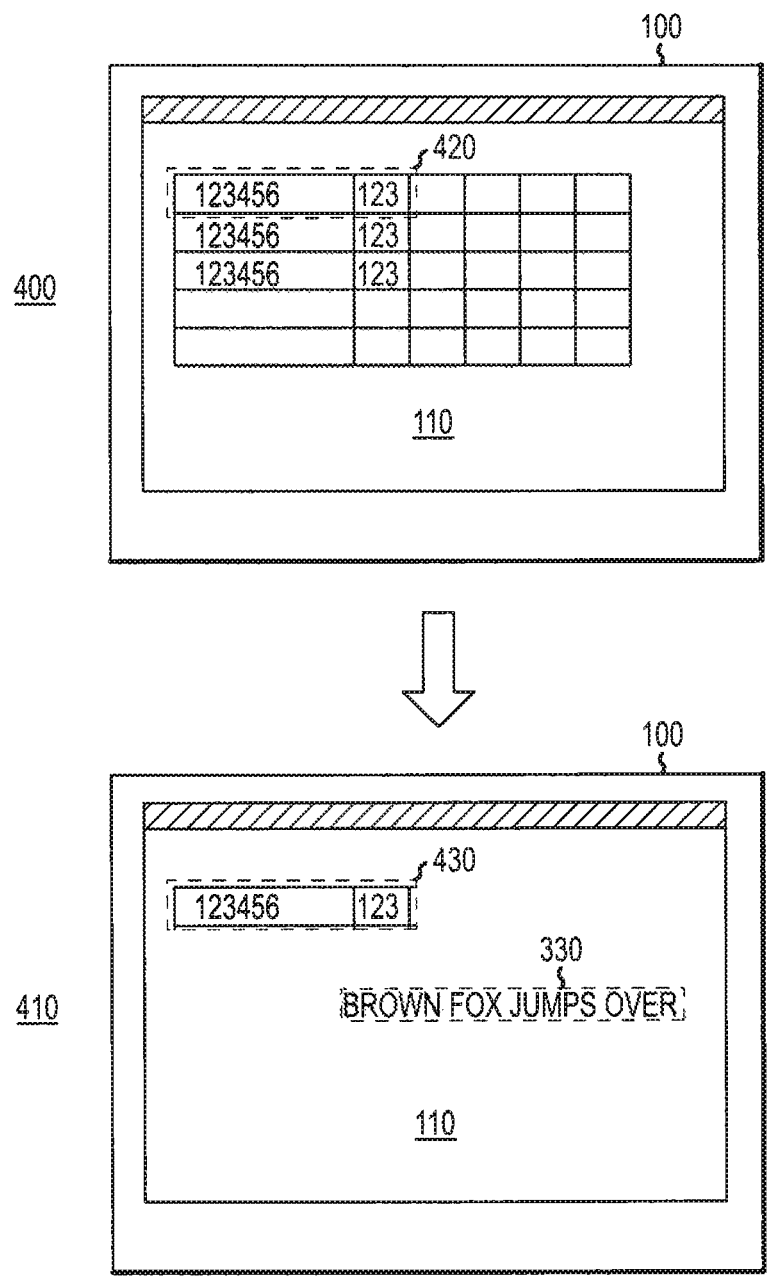
FIG. 4 is a general depiction of a virtual rendering of a software application and the simultaneous display of a portion of that window along with a portion of another software application rendering according to one embodiment of the present invention.

FIG. 4 presents a general depiction of a virtual rendering of a software application and the simultaneous display of a portion of that window along with a portion of another software application rendering according to one embodiment of the present invention. The upper portion 400 of FIG. 4 presents a software application window 110 rendering that occupies the entire viewing area of the display device 100. In this particular example, a spreadsheet application is presenting data in the form of rows and columns. As previously discussed and according to one embodiment of the present invention, a portion 420 of the spreadsheet is identified by a user for continued rendering while the remaining portion of the software application window 110 is removed from the viewing area of the display device 100.

As a result, the viewing area of the display device 100 includes two portions of different software application windows. As shown in the lower portion 410 of FIG. 4, both the selected portions of the spreadsheet 430 and the word processing document 330 remain visible on the display device while the remaining portions of each application software image is absent. In addition, only the selected portion of the images are rendered rather than a smaller version of the entire software application image as is done in the prior art.

Figure 5:
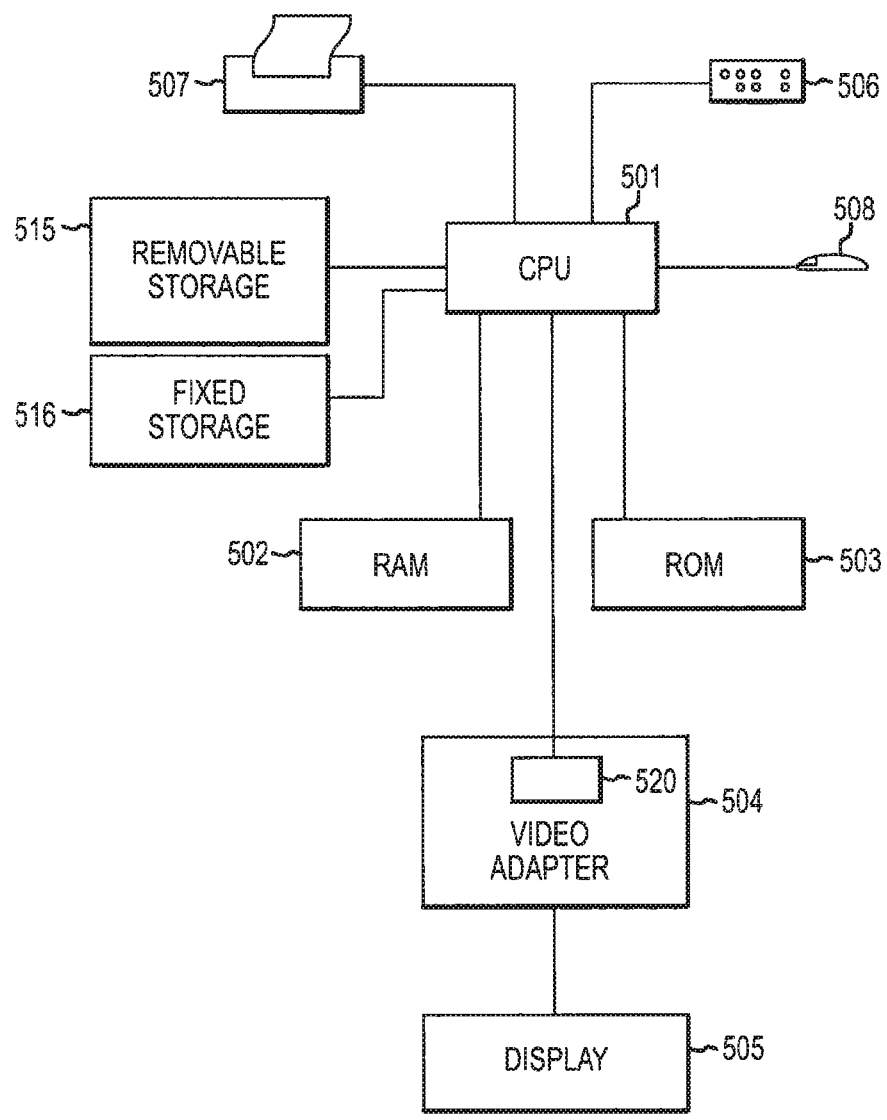
FIG. 5 is a high level block diagram of a computer system for partial window rendering of a software application window according to one embodiment of the present invention.

FIG. 5 is a high level block diagram of a computer system for partial window rendering of a software application window according to one embodiment of the present invention. FIG. 5 is a very general block diagram of a computer system such as an IBM-compatible personal computer (PC), a laptop computer, a notebook computer, a handheld or pocket computer, and/or a server computer in which software-implemented processes of the present invention may be embodied. As shown, system 500 comprises a central processing unit(s) (CPU) or processor(s) 501 coupled to a random-access memory (RAM) 502, a read-only memory (ROM) 503, a keyboard 506, a printer 507, a pointing device 508, a display or video adapter 504 connected to a display device 505, and a mass storage device 515 (e.g., hard disk, floppy disk, CD-ROM, CD-R, CD-RW, DVD, or the like). Within the video adapter 504 is a virtual display buffer 520. The system 500 can also include, but not shown separately, a communication (COMM) port(s) or interface(s), a modem, and a network interface card (NIC) or controller (e.g., Ethernet) and a real time system clock.

CPU 501 comprises a suitable processor for implementing the present invention. The CPU 501 communicates with other components of the system via a bi-directional system bus (including any necessary input/output (I/O) controller circuitry and other "glue" logic). The bus, which includes address lines for addressing system memory, provides data transfer between and among the various components. Random-access memory 502 serves as the working memory for the CPU 501. The read-only memory (ROM) 503 contains the basic input/output system code (BIOS)—a set of low-level routines in the ROM that application programs and the operating systems can use to interact with the hardware, including reading characters from the keyboard, outputting characters to printers, and so forth.

Mass storage devices 515 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 5, fixed storage 516 stores a body of program and data for directing operation of the computer system, including an operating system, user application programs, driver and other support files, as well as other data files of all sorts. Typically, the fixed storage 516 serves as the main hard disk for the system.

In basic operation, program logic (including that which implements methodology of the present invention described below) is loaded from the removable storage 515 or fixed storage 516 into the main (RAM) memory 502, for execution by the CPU 501. During operation of the program logic, the system 500 accepts user input from a keyboard 506 and pointing device 508, as well as speech-based input from a voice recognition system (not shown). The keyboard 506 permits selection of application programs, entry of keyboard-based input or data, and selection and manipulation of individual data objects displayed on the screen or display device 505. Likewise, the pointing device 508, such as a mouse, track ball, pen device, or the like, permits selection and manipulation of objects on the display device. In this manner, these input devices support manual user input for any process running on the system.

The computer system 500 displays text and/or graphic images and other data on the display device 505. The video adapter 504, which is interposed between the display 505 and the system's bus, drives the display device 505. The video adapter 504, which includes video memory accessible to the CPU 501, provides circuitry that converts pixel data stored in the video memory to a raster signal suitable for use by a cathode ray tube (CRT) raster or liquid crystal display (LCD) monitor. A hard copy of the displayed information, or other information within the system 500, may be obtained from the printer 507, or other output device.

According to one embodiment of the present invention, the video adapter 504 includes a virtual display buffer 520. In operation the virtual display buffer receives from the video adapter 504 signals for the rendering of an image on the display device 505. According to one mode of operation, the virtual display buffer 520 creates a virtual display based on these signals as well as conveys the signals to the actual display device 505. In this mode of operation, the rendering within the virtual display buffer 520 and that on the display device are identical.

In another mode of operation and based on use inputs, an identified portion of the rendered image is selected for further presentation to the display device 505. The video adapter 504 thereafter alters the image being displayed on the display device 505 so as to only render the selected portion, while the virtual display remains unchanged. The rendered portion of the image on the display device 505 is a partial, but fully functional, copy of the entire image being rendered in the virtual display buffer 520.

The system itself also communicates with other devices (e.g., other computers) via the network interface card (NIC) connected to a network (e.g., Ethernet network, Bluetooth wireless network, or the like), and/or modem (e.g., 56K baud, ISDN, DSL, or cable modem), examples of which are available from 3Com of Santa Clara, Calif. The system 500 may also communicate with local occasionally-connected devices (e.g., serial cable-linked devices) via the communication (COMM) interface, which may include a RS-232 serial port, a Universal Serial Bus (USB) interface, or the like. Devices that will be commonly connected locally to the interface include laptop computers, handheld organizers, digital cameras, and the like.

Personal computers, laptop computers, notebook computers, handheld computers, and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Santa Clara, Calif.

Figure 6:
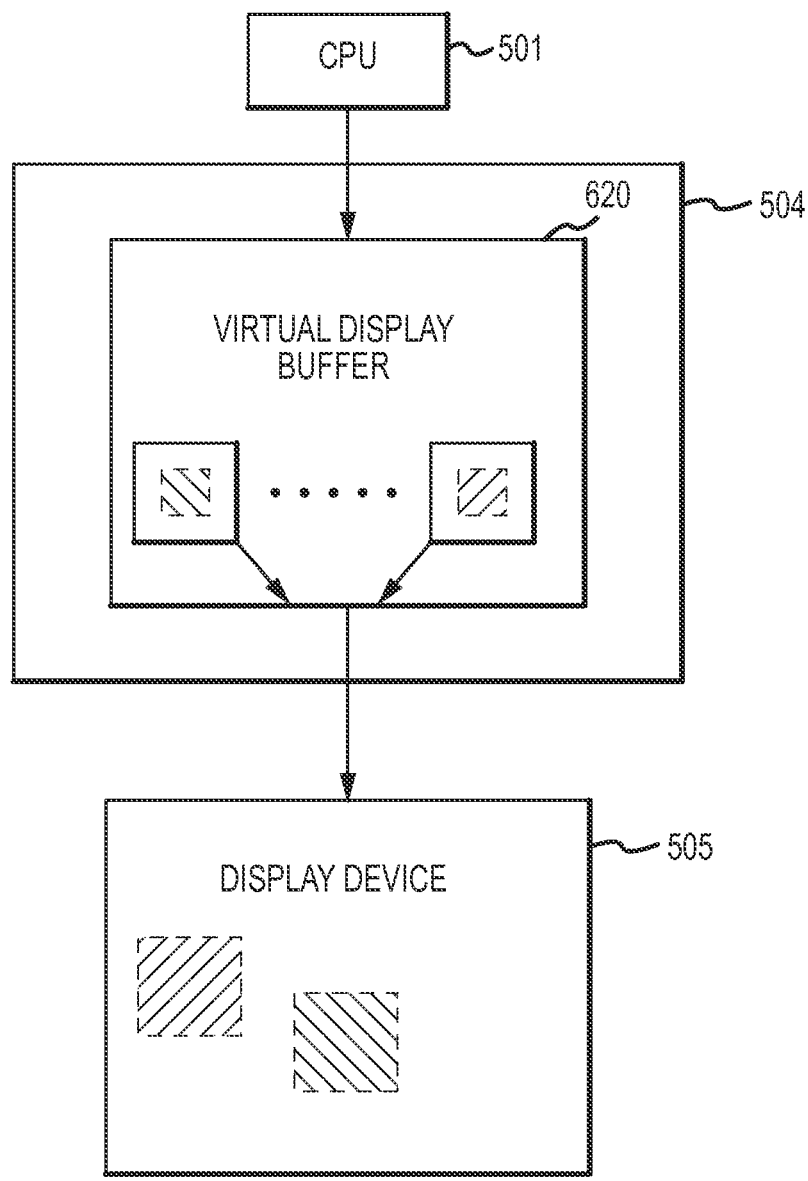
FIG. 6 is a high level block diagram of a computer system for partial window rendering of multiple software application windows according to one embodiment of the present invention.

FIG. 6 presents a high level block diagram of a system for the partial rendering of multiple software application windows according to one embodiment of the present invention. A CPU 501 associated with a computer system provides to a video adapter 504, or similar device acting as an intermediary between the CPU 501 and a display device 505, signals for the rendering of software images. According to one embodiment of the present invention, a virtual display buffer 620 intercepts the rendering signals and creates a plurality of virtual software application images. A portion of each software application image is selected for rendering on the display device 505. These selected portions are thereafter merged into a compilation of partial software application images for rendering on the display device 505.

Figure 7:
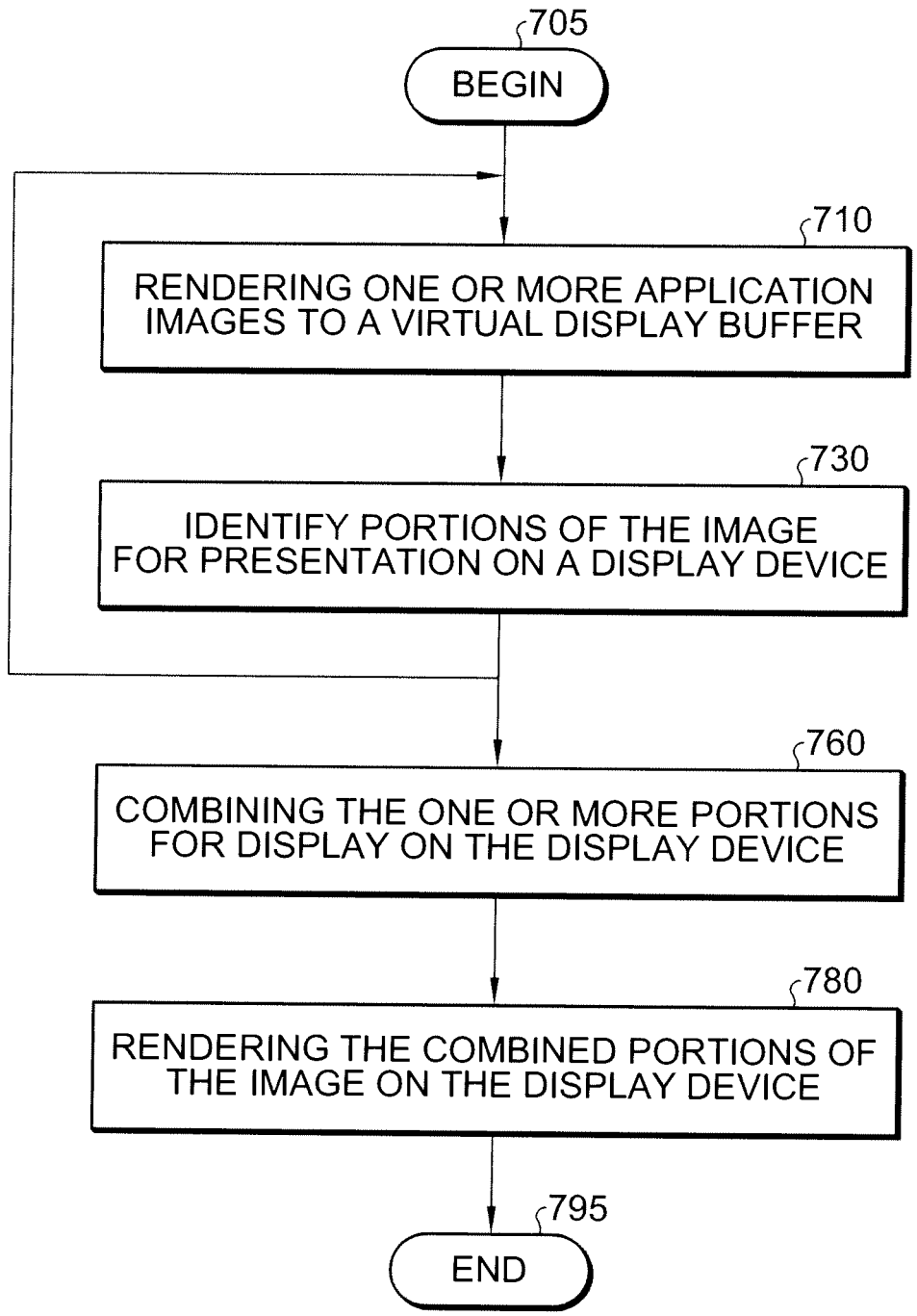
FIG. 7 is a flowchart for one method embodiment for partial rendering of a software application window according to the present invention.

FIG. 7 is a flowchart for one method embodiment for partial rendering of a software application window according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one method embodiment of the present invention, a partial rendering of a software application image begins 705 with the rendering 710 of one or more application images to a virtual display buffer. The virtual image is then, at least initially, displayed on the display device. From that display, through use of various user interfaces, a portion of the image is identified 730. This portion of the process is repetitive for each software application image. Thereafter the identified portion of the more than one software application images are combined 760 for display on the display device. The combined portions are then rendered 780 on the display device while the entire software application image associated with each portion remains as a virtual image in its entirety within the virtual display buffer.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment.

While there have been described above the principles of the present invention in conjunction with partial rendering of a display window, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for partial rendering of an application image, the system comprising:
    a microprocessor capable of executing instructions embodied as a software application;
    a display device coupled to said microprocessor capable of physically rendering at least one image based on a set of instructions embodied as a software application;
    an image adapter interposed between the microprocessor and the display device wherein the image adapter includes a virtual display buffer; and
    a plurality of software portions, wherein:
        one of said software portions is configured to physically render the at least one image on the display device;
        one of said software portions is configured to create within the virtual display buffer a virtual rendering of the at least one image;
        one of said software portions is configured to identify on the virtually rendered at least one image a portion of the at least one image; and
        one of said software portions is configured to remove from the display device the at least one image that was previously physically rendered on the display device except for the at least one portion of the at least one image, wherein the removed portion of the at least one image comprises at least a portion of at least one of a control bar or a menu of the application image;
    wherein the at least one portion of the at least one image can be repositioned on the display device through the entire viewing area of the display device, and wherein the positioning of the at least one portion of the at least one image on the display device is independent of the virtual rendering of the at least one image on the virtual display buffer.

2. The system of claim 1 wherein data within the portion of the at least one image can be modified.

3. The system of claim 1 wherein the software application operates as if all of the at least one image is rendered on the display device.

4. The system of claim 1 wherein the display device is associated with a cellular telephone.

5. The system of claim 1 wherein the display device is associated with a personal data assistant.

6. The system of claim 1 wherein one of said software portions is configured to re-render the at least one image in its entirety including a previously removed portion of the at least one image on the display device responsive to receiving a user request.

7. A computer implemented method for rendering a portion of an application image, the method comprising:
    generating by a machine an application image from a set of instructions embodied as a software application;
    physically rendering on a display device the application image;
    creating a virtual rendering of the application image in a buffer interposed between the display device and the machine;
    identifying on the application image rendered on the physical display device a first portion of the application image and a second portion of the application image; and
    removing from the display device the first portion of the application image while maintaining rendering of the second portion of the application image on the display device;
    wherein the second portion of the application image can be repositioned on the display device through the entire viewing area of the display device independent of the virtual rendering of the application image.

8. The computer implemented method of claim 7 wherein data within the second portion of the application image can be modified.

9. The computer implemented method of claim 7 wherein the software application operates as if the first portion of the application image and the second portion of the application image are continually rendered.

10. The computer implemented method of claim 7, wherein the first portion of the application image comprises at least a portion of a control bar or a menu of the application image.

11. A computer-readable storage medium tangibly embodying a program of instructions executable by a machine wherein said program of instructions comprises a plurality of program codes for rendering a portion of an application image, said program of instructions comprising:
   program code for physically rendering on a display device the application image generated by an application;
   program code for creating a virtual rendering of the application image in a buffer interposed between the display device and the machine;
   program code for identifying on the application image physically rendered on the display device a first portion of the application image and a second portion of the application image;
   program code for removing from the display device the first portion of the application image while continuing to physically render the second portion of the application image; and
   program code for repositioning the second portion of the application image on the display device independent of the virtual rendering of the application image.

12. The computer-readable storage medium of claim 11 wherein data within the second portion of the application image is user interactive.

13. The computer-readable storage medium of claim 11 wherein the application operates as if the first portion of the application image and the second portion of the application image are continually rendered.

14. The computer-readable storage medium of claim 11, wherein the first portion of the application image comprises at least a portion of one of a control bar or a menu of the application image.

15. A system for partial rendering of an application image, the system comprising:
   a microprocessor capable of executing instructions embodied as a software application;
   a display device coupled to said microprocessor capable of physically rendering at least one image based on a set of instructions embodied as a software application;
   a virtual display buffer interposed between the microprocessor and the display device; and
   a plurality of software portions, wherein one of said software portions is configured to virtually render the at least one image on the virtual display buffer; and one of said software portions is configured to copy a portion of the at least one image from the virtual display buffer to the display device such that only said portion of the at least one image copied to the display device is physically rendered on the display device, wherein the positioning of the portion of the at least one image displayed on the display device is independent of the virtual display buffer.

16. The system of claim 15 wherein the software application operates based on the at least one image rendered on the display buffer.

17. The system of claim 15 wherein one of said software portions is configured to enable a user to select the portion of the at least one image to be copied from the display buffer to the display device.

18. The system of claim 15 wherein the display device can display a plurality of portions of images generated from a plurality of software applications.

19. The computer-readable storage medium of claim 15, wherein the portion of the at least one image copied to the display device excludes at least a portion of at least one of a control bar or a menu of the at least one image.

* * * * *